US012736455B2

(12) United States Patent
Fradkin

(10) Patent No.: US 12,736,455 B2
(45) Date of Patent: Sep. 15, 2026

(54) SYSTEMS AND METHODS FOR DETECTING SUSPENDED PARTICLES IN FLUIDS

(71) Applicant: Kite Pharma, Inc., Santa Monica, CA (US)

(72) Inventor: Dmitry Fradkin, Santa Monica, CA (US)

(73) Assignee: Kite Pharma, Inc., Santa Monica, CA (US)

( * ) Notice: Subject to any disclaimer, the term of this patent is extended or adjusted under 35 U.S.C. 154(b) by 95 days.

(21) Appl. No.: 18/604,760

(22) Filed: Mar. 14, 2024

(65) Prior Publication Data

US 2024/0310265 A1 Sep. 19, 2024

Related U.S. Application Data

(60) Provisional application No. 63/490,833, filed on Mar. 17, 2023.

(51) Int. Cl.
*G01N 15/0227* (2024.01)
*G01N 15/00* (2006.01)
*G01N 15/02* (2006.01)

(52) U.S. Cl.
CPC . *G01N 15/0227* (2013.01); *G01N 2015/0053* (2013.01); *G01N 2015/0294* (2013.01)

(58) Field of Classification Search
CPC ............... G01N 21/51; G01N 21/6456; G01N 21/6428; G01N 33/383; G01N 33/42; G01N 21/31; G01N 21/6458; G01N 2021/6482; G01N 21/03; G01N 21/07; G01N 21/59; G01N 35/0099; G01N 21/23; G01N 21/39; G01N 15/0205; G01N 2021/0346; G01N 21/35; G01N 21/6452; G01N 33/491; G01N 2015/0294; G01N 2021/4707; G01N 21/00; G01N 21/4785; G01N 2201/06113; G01N 2201/105; G01N 15/075; G01N 2035/00524; G01N 2035/00534; G01N 21/4738; G01N 23/207; G01N 35/00594; G01N 9/02; G01N 21/6408; G01N 9/00; G01N 2009/024; G01N 21/211;
(Continued)

(56) References Cited

U.S. PATENT DOCUMENTS 3,679,309 A * 7/1972 Hiragaki ............ G01N 21/6445 250/361 R
7,298,480 B2 * 11/2007 Garcia-Caurel .......... G01J 4/04 356/364
(Continued)

FOREIGN PATENT DOCUMENTS

CN 101821601 A * 9/2010 ............ G01N 15/05
CN 114910422 A * 8/2022 ............ G01B 11/06
(Continued)

OTHER PUBLICATIONS

Intl. Search Report-Written Opinion dated Jun. 24, 2024 for Intl. Appl. No. PCT/2024/019856, 10 pages.

*Primary Examiner* — Michael P Stafira

(57) ABSTRACT

The present disclosure describes an automated system for physically manipulating sample fluids, capturing images of sample fluids and detecting the presence of particles, characterizing the particles by their features (e.g., size, shape, etc.), and/or identifying particles based on those characteristics.

19 Claims, 14 Drawing Sheets

(58) Field of Classification Search

CPC ...... G01N 21/25; G01N 23/20; G01N 27/026; G01N 27/028; G01N 27/221; G01N 33/4905; G01N 2021/1787; G01N 21/21; G01N 21/359; G01N 21/4795; G01N 21/55; G01N 21/645; G01N 2201/065; G01N 33/48707; G01N 33/551; G01N 35/10; G01N 35/1065; G01N 2021/0378; G01N 2021/214; G01N 2035/00326; G01N 2035/00752; G01N 2035/1051; G01N 21/01; G01N 21/41; G01N 2223/05; G01N 2223/0565; G01N 2223/102; G01N 2223/20; G01N 2223/3106; G01N 2223/317; G01N 2223/60; G01N 23/046; G01N 23/20008; G01N 23/20016; G01N 23/20033; G01N 23/201; G01N 27/24; G01N 33/487; G01N 35/0092; G01N 35/04; G01N 35/1095; G01N 1/28; G01N 2021/213; G01N 2021/513; G01N 2021/8466; G01N 21/251; G01N 21/274; G01N 21/276; G01N 21/3554; G01N 21/3577; G01N 21/64; G01N 21/65; G01N 2201/12723; G01N 2201/128; G01N 2201/1281; G01N 2201/129; G01N 2223/1016; G01N 2223/612; G01N 23/2251; G01N 33/0098; G01N 33/49; G01N 35/00; G01N 35/00069; G01N 5/00; G01N 9/30; G01N 15/01; G01N 15/0606; G01N 15/0656; G01N 15/1433; G01N 2015/019; G01N 2015/1486; G01N 2015/1497; G01N 2021/0112; G01N 2021/0339; G01N 2021/0367; G01N 2021/0371; G01N 2021/0389; G01N 2021/3155; G01N 2021/432; G01N 2021/651; G01N 2035/0094; G01N 2035/0403; G01N 2035/0406; G01N 2035/0465; G01N 2035/0477; G01N 2035/1076; G01N 21/0332; G01N 21/15; G01N 21/253; G01N 21/255; G01N 21/33; G01N 21/3563; G01N 21/3586; G01N 21/45; G01N 21/6445; G01N 21/9508; G01N 2201/0245; G01N 2201/0415; G01N 2201/064; G01N 2223/203; G01N 2223/652; G01N 23/02; G01N 23/083; G01N 24/00; G01N 27/28; G01N 27/4145; G01N 27/4146; G01N 33/48778; G01N 33/48785; G01N 33/493; G01N 33/54393; G01N 33/56972; G01N 33/82; G01N 35/00732; G01N 1/32; G01N 1/44; G01N 15/1434; G01N 17/00; G01N 17/02; G01N 2001/002; G01N 2001/007; G01N 2015/1006; G01N 2015/144; G01N 2021/015; G01N 2021/1738; G01N 2021/392; G01N 2021/399; G01N 2021/4126; G01N 2021/4771; G01N 2021/4783; G01N 2021/8848; G01N 2035/00148; G01N 2035/00356; G01N 2035/00881; G01N 2035/0405; G01N 2035/0439; G01N 2035/0441; G01N 2035/0443; G01N 2035/0444; G01N 2035/0446; G01N 2035/0453; G01N 2035/0467; G01N 2035/1025; G01N 2035/1086; G01N 21/13; G01N 21/17; G01N 21/49; G01N 21/552; G01N 21/658; G01N 21/76; G01N 21/8422; G01N 21/8806; G01N 2201/0221; G01N 2201/024; G01N 2201/0646; G01N 2201/08; G01N 2223/309; G01N 2223/419; G01N 24/08; G01N 25/18; G01N 25/4866; G01N 25/488; G01N 33/5302; G01N 33/542; G01N 33/54313; G01N 35/02; G01N 35/025; G01N 35/1004; G01N 35/1009

See application file for complete search history.

(56) References Cited

U.S. PATENT DOCUMENTS

| | | | | |
|---|---|---|---|---|
| 7,719,760 | B2 * | 5/2010 | Kim | G01N 21/21 977/881 |
| 9,500,584 | B2 * | 11/2016 | Neijzen | G01N 21/31 |
| 11,609,172 | B2 * | 3/2023 | Stahl | G03H 1/0443 |
| 2009/0213382 | A1 * | 8/2009 | Tracy | G01N 21/553 137/565.17 |
| 2010/0248283 | A1 * | 9/2010 | Xiao | G01N 21/553 435/29 |
| 2016/0109354 | A1 | 4/2016 | Koseki et al. | |
| 2016/0243560 | A1 * | 8/2016 | Wong | G01N 21/17 |
| 2017/0315045 | A1 * | 11/2017 | Silcott | G01N 15/1459 |

FOREIGN PATENT DOCUMENTS

| | | | | |
|---|---|---|---|---|
| JP | 2007525648 A * | 9/2007 | | G01N 15/1459 |
| JP | WO2008078475 A1 * | 4/2010 | | G02B 21/24 |
| WO | WO-2010058168 A1 * | 5/2010 | | G01N 27/76 |
| WO | WO-2015004862 A1 * | 1/2015 | | G01N 33/48 |

* cited by examiner

SYSTEMS AND METHODS FOR DETECTING SUSPENDED PARTICLES IN FLUIDS

CROSS REFERENCE TO RELATED APPLICATIONS

This application claims priority to U.S. Provisional Patent Application No. 63/490,833 filed on Mar. 17, 2023, which is hereby incorporated in its entirety.

FIELD OF THE INVENTION

The present disclosure generally relates to systems and methods for detecting and characterizing suspended particles in a fluid. More specifically, the disclosure relates to improved systems and methods of detecting particles within a flexible container (e.g., a cell therapy bag).

BACKGROUND

At various stages of a manufacturing processes for the life sciences and pharmaceutical industries it is desirable and often necessary to examine sample fluid or material for defects. For example, in a manufacturing process for a cell therapy treatment, containers (e.g., single-use bags) carrying patient samples, reagents, ingredients, and/or final products may include unwanted or potentially hazardous particles. This is especially important for personalized medical products being administered to patients. In some cases, the unwanted particles may also require characterization and/or rejection as required by existing regulatory laws or industry standards. Particles can originate from a variety of sources, including, biological debris or foreign objects.

In addition to complying with regulations, examining a final product (e.g., a cell therapy final product) for the presence of particles followed by characterization and/or identification may be beneficial for providing the best possible treatment to a patient. The problem with human assisted detection, characterization, and identification of particles includes high costs, low efficiencies, and decreased effectiveness. For example, if a human is responsible for moving containers during the process, an automated imaging system may interpret dislodged bubbles as particles which leads to false positives.

Once a particle has been properly characterized and/or identified a decision can be made regarding how the final product is treated. For example, the final product may be unsuitable for use, may require additional filtration, or no action may be required.

What is needed is an automated system that can physically manipulate the containers, capture images of a sample fluid therein, detect the presence of particles, characterize the particles by their features (e.g., size, shape, etc.), and/or identify particles based on those characteristics. However, automating such a system is complex. An example of a technical obstacle includes distinguishing smudges, distortions, and discoloration on containers from particles. The embodiments described herein solve these and other problems.

SUMMARY

In various aspects, a system for detecting one or more particles in a sample fluid is described according to various embodiments. In various embodiments, the system for detecting one or more particles in a sample fluid may include a motor for providing angular momentum to a rotational stage. In various embodiments, the system for detecting one or more particles in a sample fluid may include a light source for emitting a light beam, wherein the light source is mounted to the rotational stage. In various embodiments, the system for detecting one or more particles in a sample fluid may include a sample chamber removably coupled to the light source. In various embodiments, the system for detecting one or more particles in a sample fluid may include a light detector. In various embodiments, the sample chamber physically restrains a sample container between a first optical element and a second optical element. In various embodiments, the first optical element polarizes the light beam along a first plane and the second optical element polarizes the light beam along a second plane.

In various embodiments, the sample chamber further comprises a first plate joined to a second plate by a curved region to create a space. In various embodiments, a first rail and a second rail extend away from the first plate of the sample chamber. In various embodiments, the light source comprises a first surface having a first channel and an opposing second surface having a second channel. In various embodiments, the first rail engages the first channel and the second rail engages the second channel to couple the sample chamber to the light source. In various embodiments, the sample container comprises a compartment surrounded by a perimeter and the perimeter fits into the space of the sample chamber. In various embodiments, the compartment comprises a translucent flexible material.

In various embodiments, the sample container further comprises an air vent connecting the compartment to an external atmosphere. In various embodiments, the sample container further comprises an outlet fluidically coupled to the compartment. In various embodiments, the sample container further comprises an inlet fluidically coupled to the compartment.

In various embodiments, the first plate and the second plate of the sample chamber each comprise a closing element extending along a first end of the plate to create a slot. In various embodiments, the first plate and the second plate of the sample chamber each comprise a cavity extending along a second end of the plate. In various embodiments, the first optical element is positioned within the slot and the cavity of the first plate and the second optical element is positioned within the slot and the cavity of the second plate.

In various embodiments, the first plane and the second plane are offset by between 80 to 100 degrees. In various embodiments, the first plane and the second plane are offset by 90 degrees.

In various embodiments, the light detector includes a camera for capturing a first image and a second image of a sample fluid contained within the sample container. In various embodiments, the light source includes a light emitting diode (LED). In various embodiments, the light source is positioned to illuminate the entire sample fluid.

In various embodiments, the system for detecting one or more particles in a sample fluid may further comprise an image analysis system. In various embodiments, the image analysis system comprises a data store for receiving light intensity data for the first image and the second image. In various embodiments, the image analysis system comprises a computing device communicatively connected to the data store and configured to receive the light intensity data. In various embodiments, the computing device comprises a non-transitory computer readable storage medium containing instructions which, when executed on one or more data processors, cause the one or more data processors to perform a process.

In various embodiments, the process comprises detecting one or more particles in the sample fluid. In various embodiments, the process comprises characterizing a set of properties of the one or more particles. In various embodiments, the process comprises identifying the one or more particle based on the set of properties. In various embodiments, the set of properties includes one of at least shape and size.

In various embodiments, the step of detecting the one or more particles comprises calculating a minimum threshold intensity for the pixels of the first image and the second image. In various embodiments, the step of detecting the one or more particles comprises determining a set of features corresponding to pixel intensities above the minimum threshold intensity for first image and the second image. In various embodiments, the step of detecting the one or more particles comprises determining a subset of features from the set of features that appear in different locations between the first image and the second image. In various embodiments, the features in the subset represent the one or more particles.

In various embodiments, the step of characterizing the one or more particles comprises mapping a set of pixels for each of the features in the subset of features to a coordinate system. In various embodiments, the step of characterizing the one or more particles comprises comparing the set of pixels to a library. In various embodiments, the library comprises one or more sets of pixels each corresponding to at least one characteristic. In various embodiments, the at least one characteristic includes shape or size. In various embodiments, the step of characterizing the one or more particles comprises determining at least one of a shape and size of the one or more particles based on the comparison.

In various embodiments, the step of identifying the one or more particle comprises comparing the determined at least one of shape and size of the one or more particles to a library of previously identified particles. In various embodiments, the previously identified particles are associated with at least one of shape and size.

In various embodiments, the system further comprises an output device for presenting output data. In various embodiments, the output data includes at least one of a particle presence indication, a particle size, a particle shape, and a particle identity.

In various embodiments, the sample fluid comprises a cell therapy product.

In various aspects, a method for detecting one or more particles in a sample fluid is described according to various embodiments. In various embodiments, the method includes rotating a sample fluid from a first position to a second position. In various embodiments, the method includes rotating the sample fluid from the second position to the first position. In various embodiments, the method includes polarizing an emitted light beam along a first plane. In various embodiments, the method includes passing the polarized light beam through the sample fluid. In various embodiments, the method includes polarizing the light beam emitted from the sample fluid along a second plane. In various embodiments, the method includes detecting scattered light subsequent to polarization along the first plane and the second plane.

In various embodiments, the first plane and the second plane are offset by between 80 to 100 degrees. In various embodiments, the first plane and the second plane are offset by 90 degrees.

In various embodiments, the method further comprises delivering the sample fluid to a sample container. In various embodiments, the step of delivering the sample fluid to the sample container comprises delivering the sample fluid into a compartment of the sample container using an inlet port, wherein the inlet port is fluidically connected to the compartment.

In various embodiments, the method comprises positioning a perimeter of the sample container into a space of the sample chamber. In various embodiments, the method comprises capturing a first image and a second image of the sample fluid. In various embodiments, the step of passing the polarized light beam through the sample fluid comprises illuminating the entire sample fluid with the polarized light beam along the first plane.

In various embodiments, the method further comprises detecting one or more particles in the sample fluid. In various embodiments, the method further comprises characterizing a set of properties of the one or more particles. In various embodiments, the method further comprises identifying the one or more particles based on the set of properties.

In various embodiments, the step of detecting the one or more particles comprises calculating a minimum threshold intensity for the first image and the second image. In various embodiments, the step of detecting the one or more particles comprises determining a set of features above the minimum threshold intensity for the first image and the second image. In various embodiments, the step of detecting the one or more particles comprises determining a subset of features from the set of features that appear in different locations between the first image and the second image. In various embodiments, the features in the subset represent the one or more particles.

In various embodiments, the step of characterizing the one or more particles comprises mapping a set of pixels for each of the features in the subset of features to a coordinate system. In various embodiments, the step of characterizing the one or more particles comprises comparing the set of pixels to a library, wherein the library comprises at least one of shape and size data. In various embodiments, the step of characterizing the one or more particles comprises determining at least one of a shape and size of the one or more particles.

In various embodiments, the step of identifying the one or more particles comprises comparing the at least one of shape and size of the one or more particles to a library of previously identified particles. In various embodiments, the previously identified particles are associated with at least one of shape and size.

In various embodiments, the method comprises presenting output data. In various embodiments, the output data includes at least one of a particle presence indication, a particle size, a particle shape, and a particle identity.

In various embodiments, the rotational movement is provided by a motor. In various embodiments, the emitted light beam is emitted by a light source. In various embodiments, the light source comprises an LED. In various embodiments, the sample fluid comprises a cell therapy product.

DETAILED DESCRIPTION OF CERTAIN EMBODIMENTS

The present disclosure, among other things, provides insights and technologies useful in detecting, characterizing, and/or identifying particles in fluids. More specifically, the embodiments described herein may be useful in the life sciences and pharmaceutical industries to ensure patient safety and regulatory compliance. For example, detecting, characterizing, and/or identifying particles in a final product (e.g., a cell therapy product for a patient) may provide information useful in determining whether a product is suitable for administering to a patient.

Embodiments of systems, apparatuses, and methods for detecting, characterizing, and/or identifying particles in fluids are described in the accompanying description and figures. In the figures, numerous specific details are set forth to provide a thorough understanding of certain embodiments. A skilled artisan will appreciate that the systems and methods described herein may be used in a variety of ways and circumstances that are not limited to what is specifically detailed. Additionally, the skilled artisan will appreciate that certain embodiments may be practiced without these specific details. Furthermore, one skilled in the art can readily appreciate that the specific sequences in which methods are presented and performed are illustrative and it is contemplated that the sequences can be varied and still remain within the spirit and scope of certain embodiments.

While the present teachings are described in conjunction with various embodiments, it is not intended that the present teachings be limited to such embodiments. On the contrary, the present teachings encompass various alternatives, modifications, and equivalents, as will be appreciated by those skilled in the art.

Exemplary Systems

Figure 1:
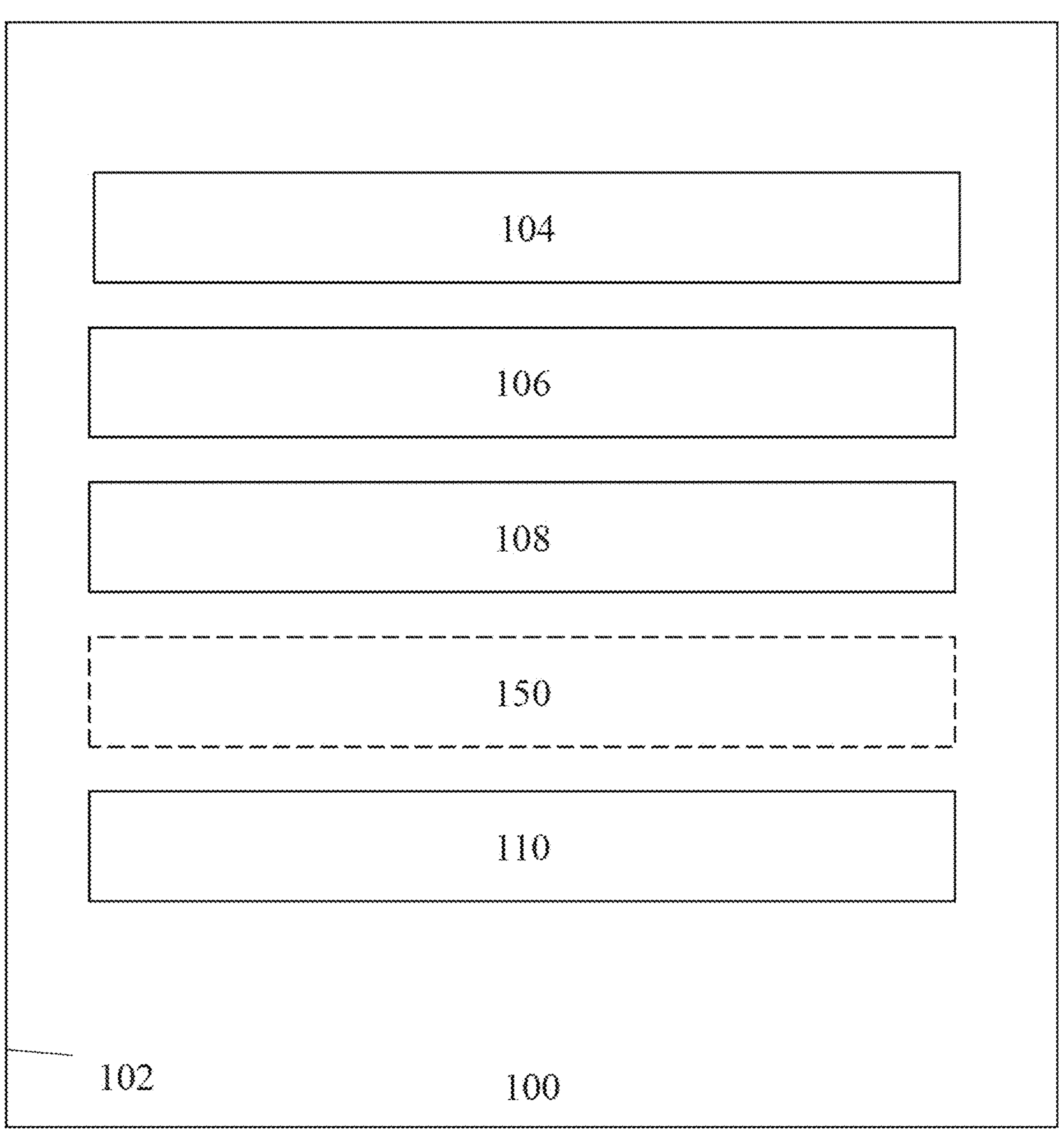
FIG. 1 is a schematic diagram of a system for detecting, characterizing, and/or identifying suspended particles in fluids in accordance with various embodiments.

FIG. 1 is a schematic diagram of a system 100 for detecting, characterizing, and/or identifying suspended particles in fluids in accordance with various embodiments. In various embodiments, a may include a motor 104, a stage 106, a light source 108, a sample chamber 150, and a light detector 110. In various embodiments, one or more of the components 104, 106, 108, 150, 110 may be mounted to a housing 102. In many embodiments, the sample chamber 150 may be removeable from the housing 102. In some embodiments, one or more of the components 104, 106, 108, 150, 110 are arranged vertically with respect to one another. In some embodiments, one or more of the components 104, 106, 108, 150, 110 are arranged horizontally with respect to one another.

Figure 2:
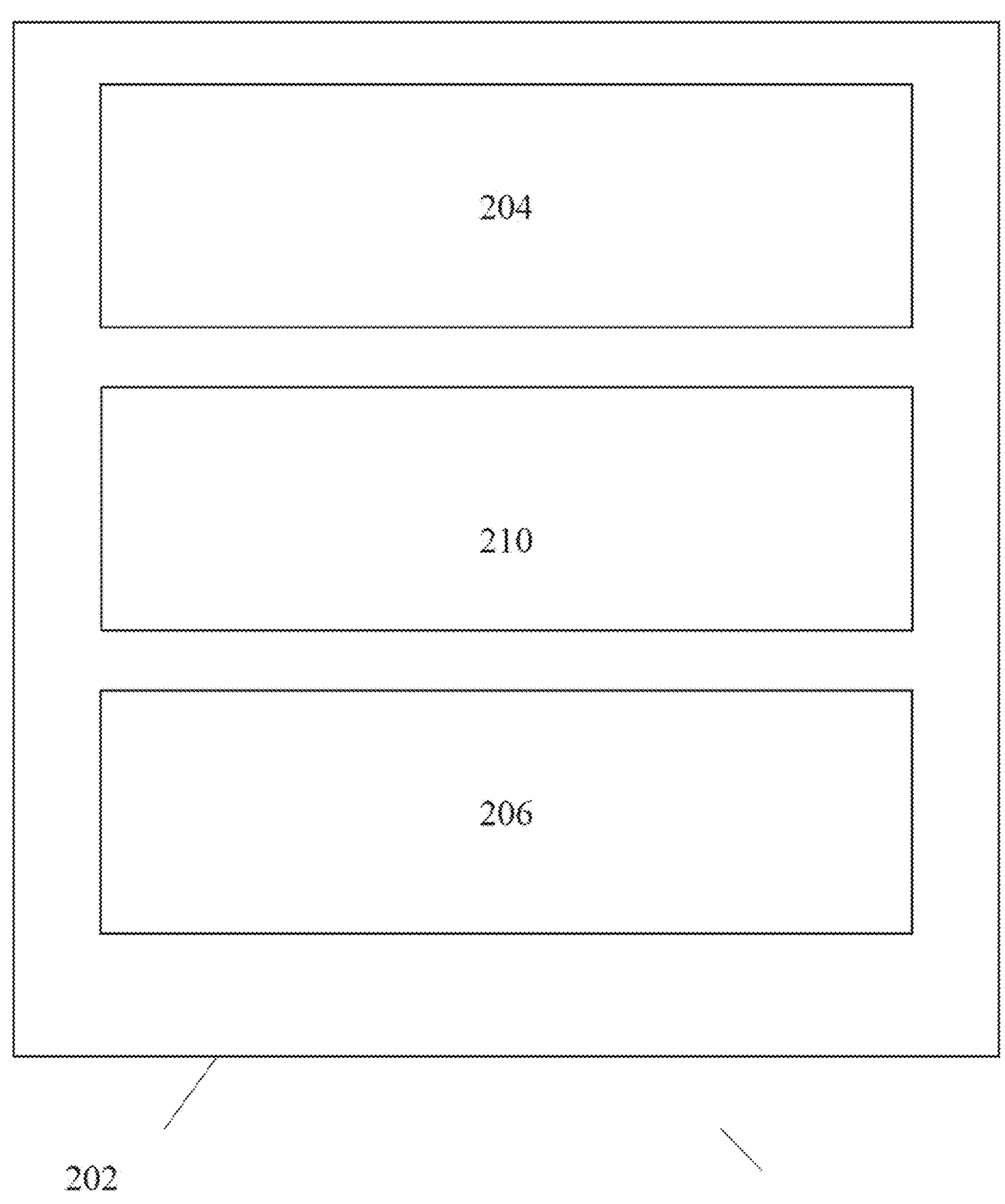
FIG. 2 is a schematic diagram of a sample chamber used in a system for detecting, characterizing, and/or identifying suspended particles in fluids in accordance with various embodiments.

FIG. 2 is a schematic diagram of a sample chamber 150 used in a system for detecting, characterizing, and/or identifying suspended particles in fluids in accordance with various embodiments. In various embodiments, a sample chamber may include a sample 210. In many embodiments, the sample 210 may be positioned between a first optical element 204 and a second optical element 206. In various embodiments, a sample chamber housing 206 may be used to secure the sample between the first optical element 204 and the second optical element 206. In various embodiments, the sample chamber housing 206 may physically interact with the sample 210, the first optical element 204, and the second optical element 206 to restrict their movement relative to one another. In some embodiments, one or more of the components 204, 206, and 210 are arranged vertically with respect to one another. In some embodiments, one or more of the components 204, 206, and 210 are arranged horizontally with respect to one another.

Figure 3:
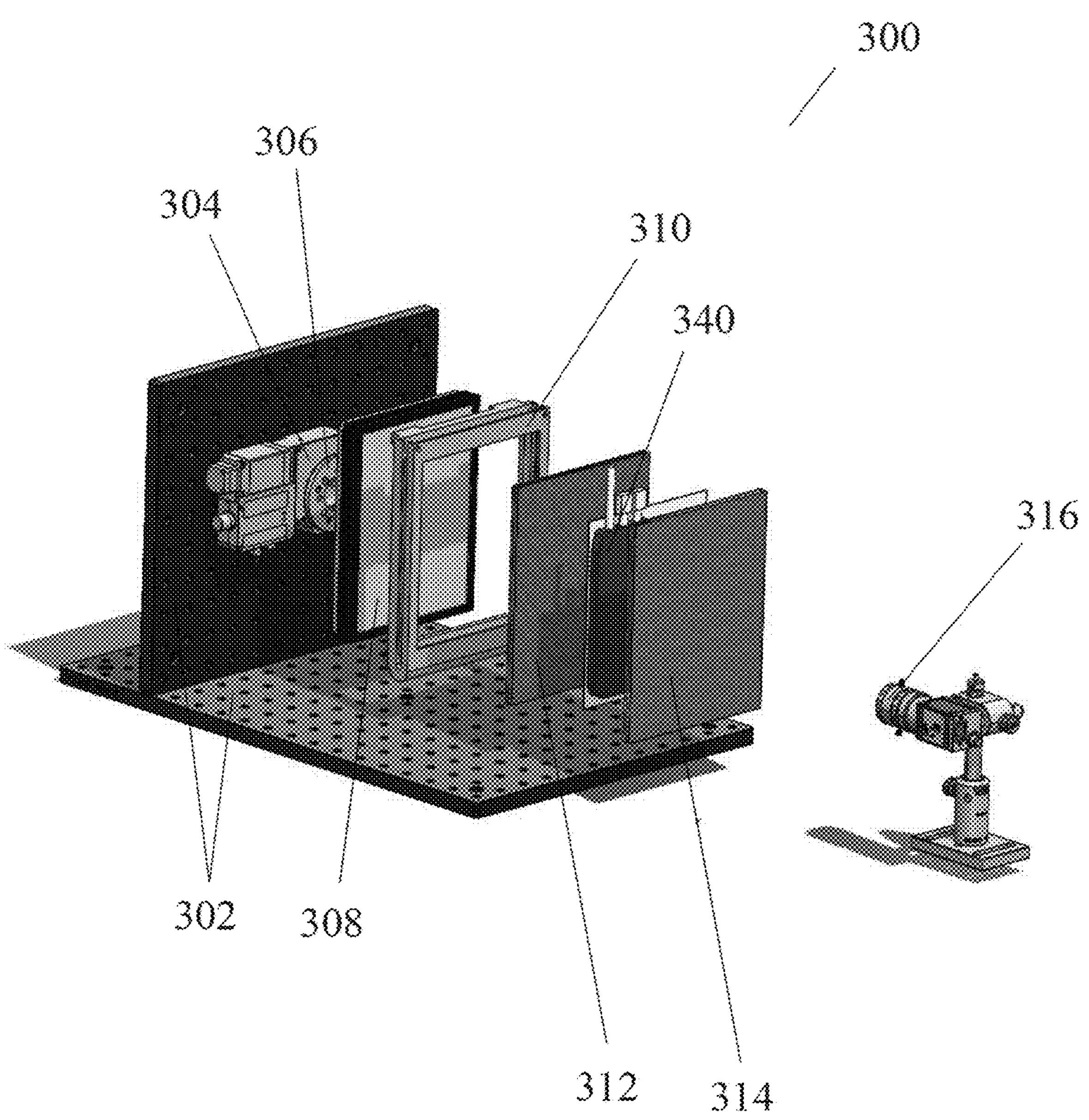
FIG. 3 is an exploded view of a system for detecting, characterizing, and/or identifying suspended particles in fluids in accordance with various embodiments.

FIG. 3 is an exploded view of a system 300 for detecting, characterizing, and/or identifying suspended particles in fluids in accordance with various embodiments.

In various embodiments, a system housing 302 may be included to surround and/or protect the components of the system 300. In various embodiments, one or more components of the system 300 may be mounted or secured to the housing 300. Mounting or securing may be accomplished in a variety of different ways known in the art. Non-limiting examples of devices used to mount components to the housing 300 may include one or more welds, adhesives, screws, tacks, pins, rivets, or anything known in the art and in any useful combination. Further the various components described herein may be mounted, coupled, or secured to one another using the same or similar devices.

In various embodiments, the system 300 may comprise a motor 304 mounted to a housing 302 or a portion thereof. In various embodiments, the motor 304 may be mechanically coupled to a rotational stage 306 and the motor 304 may provide angular momentum to the rotational stage 306. In various embodiments, the angular momentum may occur along a single plane or axis.

In various embodiments, the system 300 may comprise a light source 308 mounted to a rotational stage 306 in a manner allowing angular momentum to be transferred from a motor 304 to the light source 308. In various embodiments, the light source 308 may comprise a light emitting diode (LED).

In various embodiments, the system 300 may comprise a sample chamber 310 mounted to a light source 308. In various embodiments, a motor 304 may transfer angular momentum to the sample chamber 310 using the light source 308 as an intermediary.

In various embodiments, the system may comprise a sample container 340 inserted into a sample chamber 310. In various embodiments, the sample container 340 may be physically immobilized or at least partially immobilized within the sample chamber 310.

Figure 4:
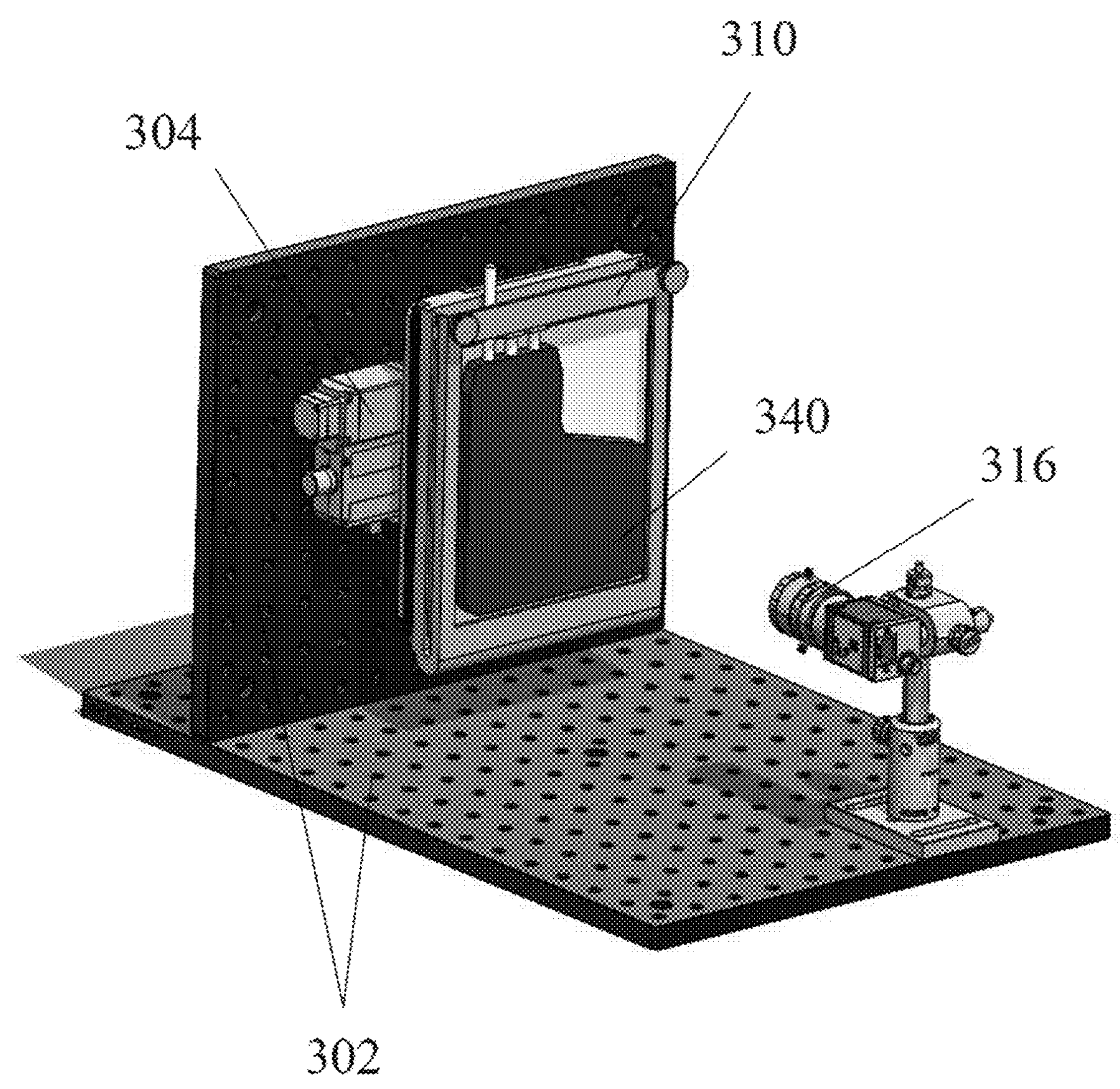
FIG. 4 is the system shown in FIG. 3 for detecting, characterizing, and/or identifying suspended particles in fluids including a sample container inserted into a sample chamber in accordance with various embodiments.

In various embodiments, the system 300 may comprise a sample container 340 positioned between a first optical element 312 and a second optical element 314 (See FIG. 4). In various embodiments, a sample chamber 310 physically restrains a sample container 340 between a first optical element 312 and a second optical element 314. In various embodiments, the first optical element 312 polarizes light along a first plane and the second optical element 314 polarizes light along a second plane.

In various embodiments, the system 300 may comprise a light detector 316. For example, light may be projected from a light source 308, polarized a first time by a first optical element 312, then pass through a sample container 340, polarized a second time by a second optical element 314, and then the light may be detected by a light detector 316.

In some embodiments, one or more of the components 316, 314, 312, 310, 308, 302, 306, and 304 are arranged vertically with respect to one another. In some embodiments, one or more of the components 316, 314, 312, 310, 308, 302, 306, and 304 are arranged horizontally with respect to one another. In some embodiments, the system does not include one or more of components 312 and 314.

Figure 5:
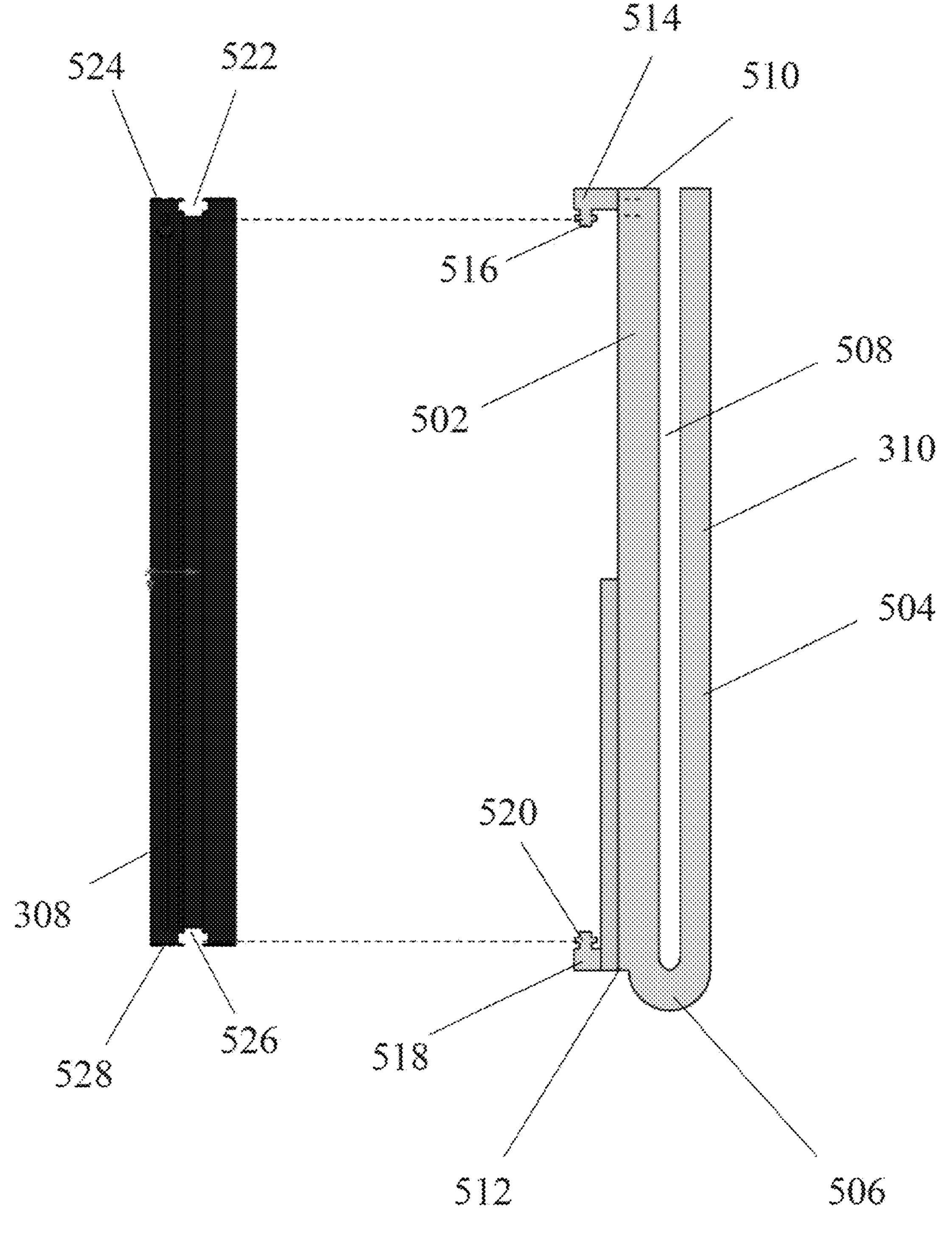
FIG. 5 is an exploded, side view of a of sample chamber and a light source in accordance with various embodiments.

FIG. 5 is an exploded, side view of a of sample chamber 310 and a light source 308 in accordance with various embodiments.

In various embodiments, a side view of a sample chamber 310 resembles a "U" shape. In various embodiments, a sample chamber 310 may comprise a first plate 502 connected to a second plate 504 by a curved region 506, thereby, creating a space 508 into which a sample container may be inserted.

In various embodiments, a first plate 502 may extend from a first end 510 to a second end 512. In various embodiments, a first protrusion 514 may be positioned at the first end 510 and extend away from an exterior face of the first plate 502. In various embodiments, the first protrusion 514 may engage with a portion of a light source 308 to couple the sample chamber 310 to the light source 308. In various embodiments, the first protrusion 514 may include a first rail 516 and the first rail 516 may interact with a portion of the light source 308 to couple the sample chamber 310 to the light source 308.

In various embodiments, a second protrusion 518 may be positioned at the second end 512 and extend away from an exterior face of the first plate 502. In various embodiments, the second protrusion 518 may engage with a portion of a light source 308 to couple the sample chamber 310 to the light source 308. In various embodiments, the second protrusion 518 may include a second rail 520 and the second rail 520 may interact with a portion of the light source 308 to couple the sample chamber 310 to the light source 308.

In various embodiments, a light source 308 may extend from a first surface 524 to a second surface 528. In various embodiments, the light source 308 may be substantially rectangular and include four sides. The four sides may include two substantially parallel sides that connect the first surface 524 to the second surface 528 and the sides may enclose two planar surfaces. In various embodiments, a light emitting diode may project light away from one or both of the planar surfaces.

In various embodiments, a first channel 522 may extend along the first surface 524. In various embodiments, the first channel 522 may physically interact with the first rail 516 of the sample chamber 310 to couple the light source 308 to the sample chamber 310.

In various embodiments, a second channel 526 may extend along the second surface 528. In various embodiments, the second channel 526 may physically interact with the second rail 520 of the sample chamber 310 to couple the light source 308 to the sample chamber 310.

In various embodiments, both channels 522, 526 may interact with both rails 516, 520 respectively to couple the sample chamber 310 to the light source 308.

In various embodiments, the rails 516, 520 may be designed to match the profile of the channels 522, 526. For example, in some embodiments, the rails 516, 520 may comprise one or more projections that may be designed to physically abut one or more walls of the channels 522, 526. In some embodiments, the rails 516, 520 may each take the form of a cross having a stem that projects away from the protrusions 514, 518 and include three projections. In such an embodiment, the channels 522, 526 may comprise a female opposite.

Figure 6:
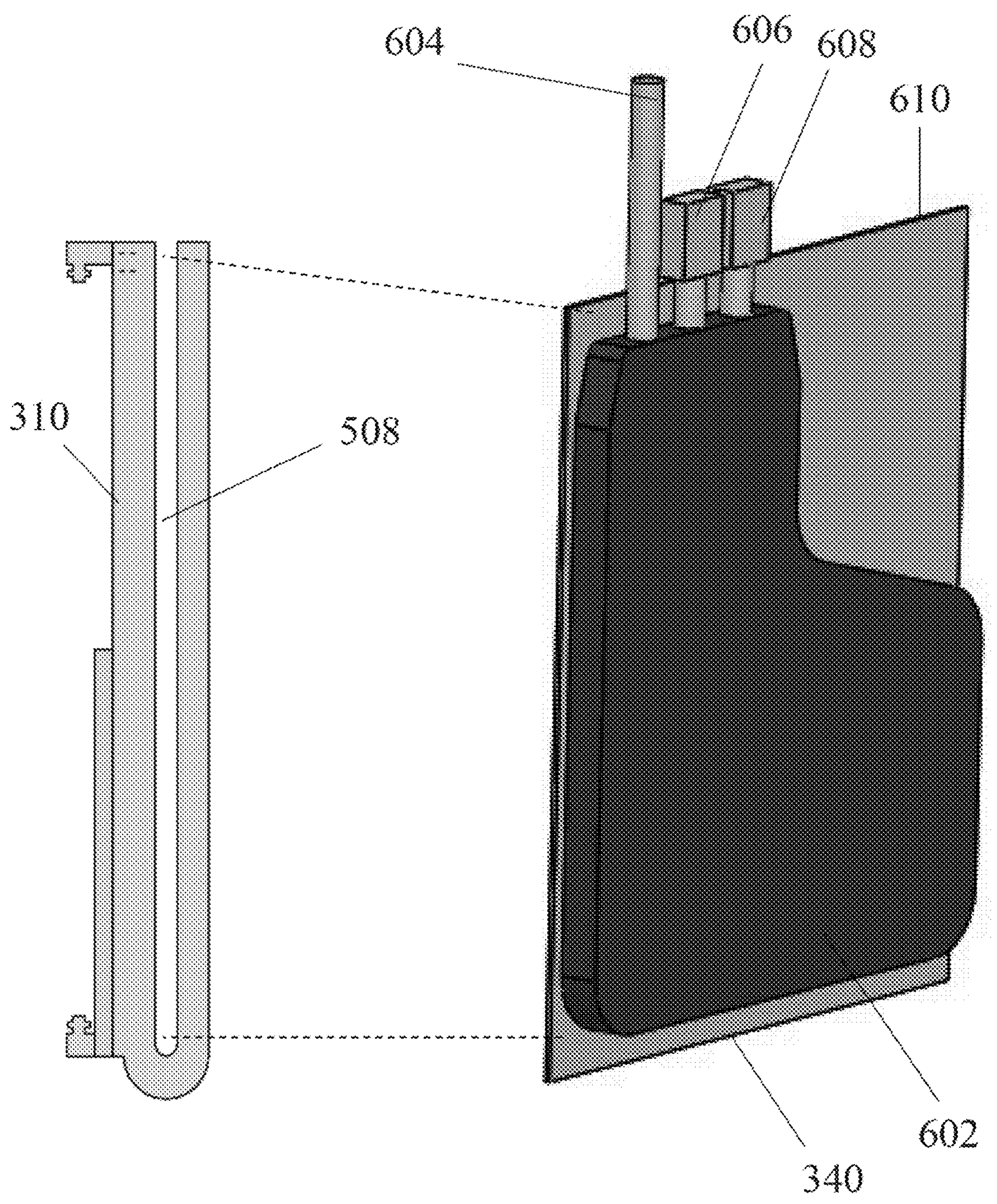
FIG. 6 is an exploded view of a sample container and a sample chamber according to various embodiments.

FIG. 6 is an exploded view of a sample container 340 and a sample chamber 310 according to various embodiments. In various embodiments, a sample chamber 310 can receive a sample container 310. For example, a use may insert the sample container 340 into the sample chamber 310 to undergo analysis.

In various embodiments, a sample container 310 may comprise a perimeter 604 surrounding a compartment 602. In various embodiments, the compartment 602 may hold a fluid sample to be analyzed.

In various embodiments, a sample container 310 may comprise an inlet 606 fluidically coupled to a compartment 602. In various embodiments, the sample container 310 may comprise an outlet 608 fluidically coupled to the compartment 602. In various embodiments, the sample container 310 may comprise an air vent 610 that connects the compartment 602 to atmosphere.

Figure 7:
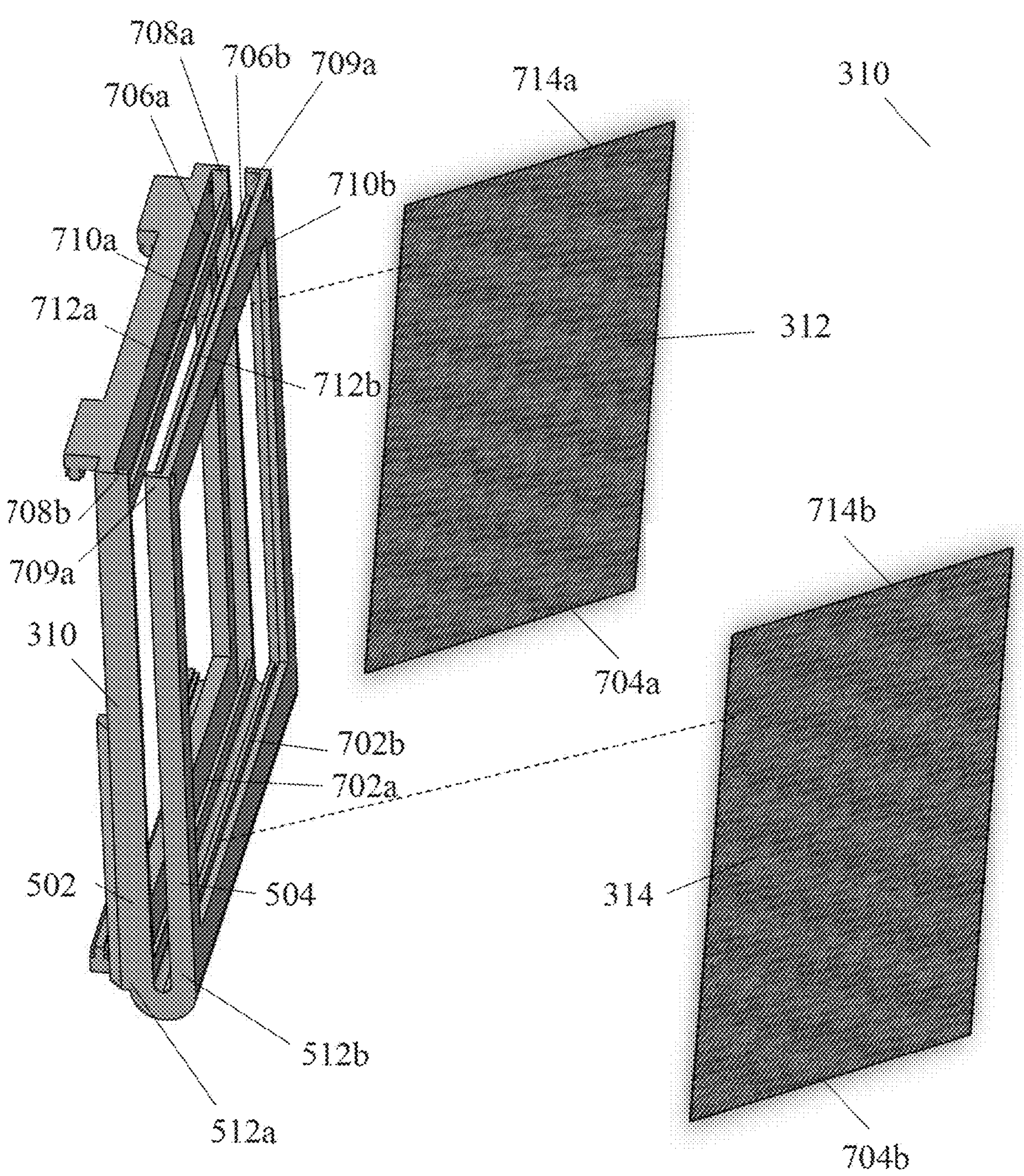
FIG. 7 is an exploded view of a sample chamber and optical elements according to various embodiments.

FIG. 7 is an exploded view of a sample chamber 310 and optical elements 312, 314 according to various embodiments.

In various embodiments, a sample chamber 310 may comprise a first plate 502 and a second plate 504. In various embodiments, the first plate 502 may be designed to receive a first optical element 312 and the second plate may be designed to receive a second optical element 314. For example, the optical elements 312, 314 may insert into the plates 502, 504 and the plates may act as a frame for holding the optical elements 312, 314.

In various embodiments, each plate 502, 504 may comprise a cavity **702*a*, 702*b* for receiving a first end 704*a*, 704*b* of the optical elements 312, 314. For example, the cavities 702*a*, 702*b* may extend along an interior portion of the second ends 512*a*, 512*b* of the plates 502, 504 and the optical elements 312, 314 may be positioned for use once the first ends 704*a*, 704*b* abut a surface of the cavities 702*a*, 702*b***.

In various embodiments, each plate 502, 504 may comprise a slot **706*a*, 706*b* extending along the length of the first ends 510*a*, 510*b* of the plates 502, 504. In various systems, the first ends 704*a*, 704*b* of the optical elements 312, 314 may be inserted into the slots 706*a*, 706*b* and slide along the plates 502, 504 until the second ends 714*a*, 714*b* of the optical elements 312, 214 are positioned adjacent to the slots 706*a*, 706*b***.

In various embodiments, a slot **706*a*, 706*b* may be formed by two opposing sides 708*a*, 708*b*, 709*a*, 709*b* extending away from a wall 710***a*, 710*b* near the first end 510*a*, 510*b* of a plate and each side 708*a*, 708*b*, 709*a*, 709*b* connecting to an opposing end of an enclosing element 712*a*, 712*b*. In various embodiments, the enclosing element may comprise a rectangular, planar material. The slots 706*a*, 706*b* and the cavities 702*a*, 702*b* may work together to form a sleeve for the optical elements 312, 314.

In various embodiments, an optical element may comprise a light filter. In various embodiments, an optical element may comprise a light filter fitted into a frame. In various embodiments, the frame may include acrylic panels. In various embodiments, the light filter may abut directly against a surface of the sample chamber. In various embodiments, the frame may abut the sample chamber.

Figure 8:
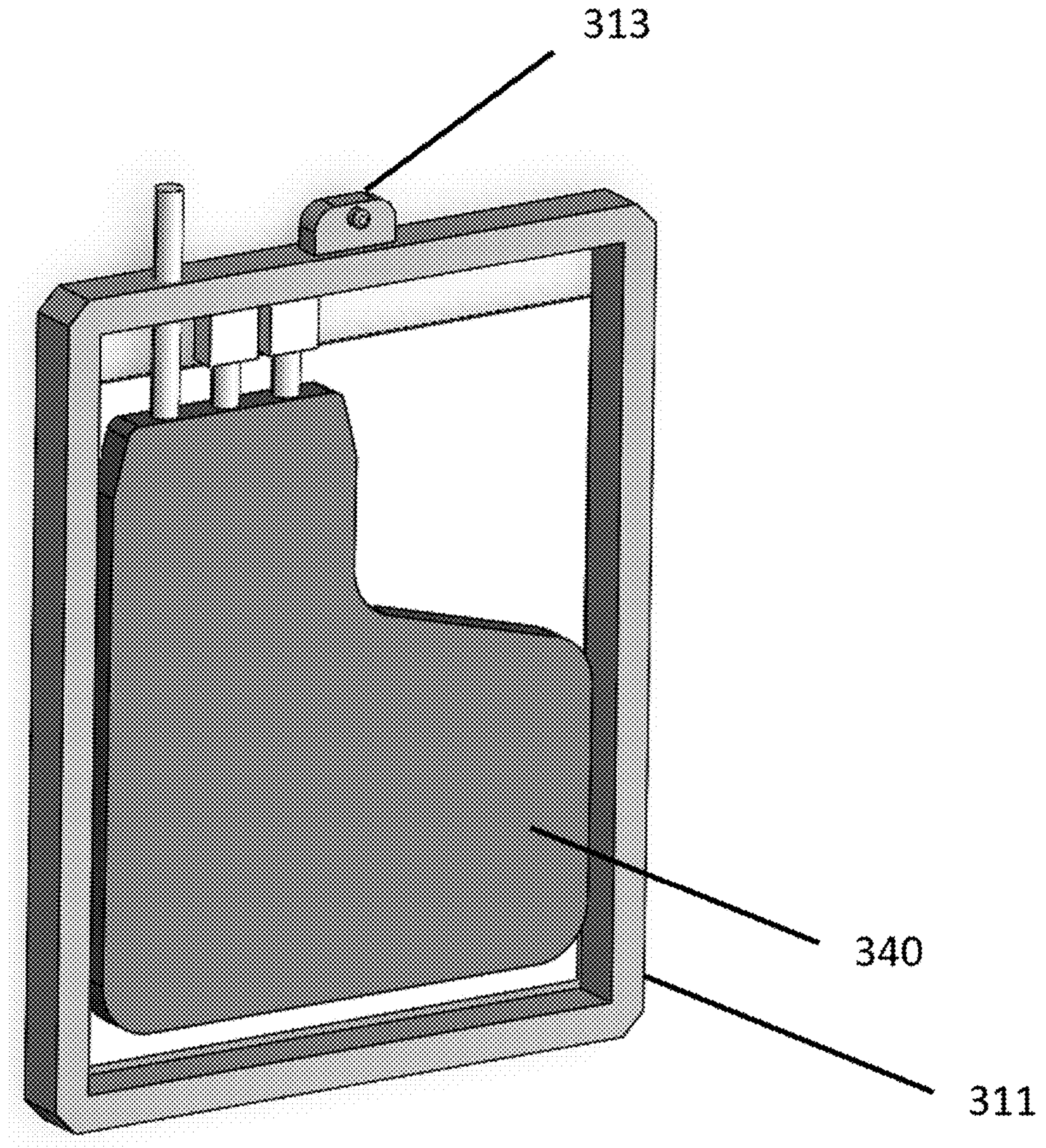
FIG. 8 shows the sample container of FIGS. 3-6 placed within a rigid adapter for engaging with a robotic arm according to various embodiments.
Figure 9A:
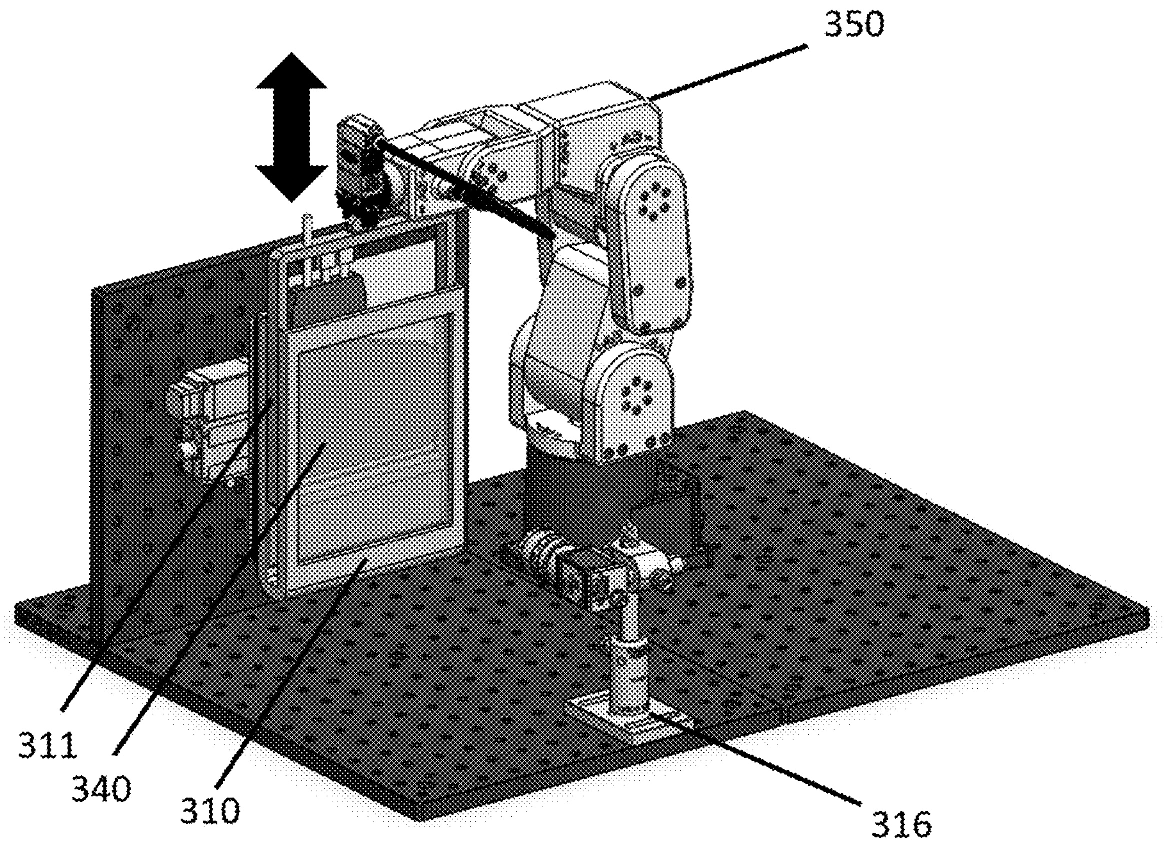
FIG. 9A is a perspective view of the sample container of FIG. 8 placed within the rigid adapter and engaged to a robotic arm according to various embodiments.
Figure 9B:
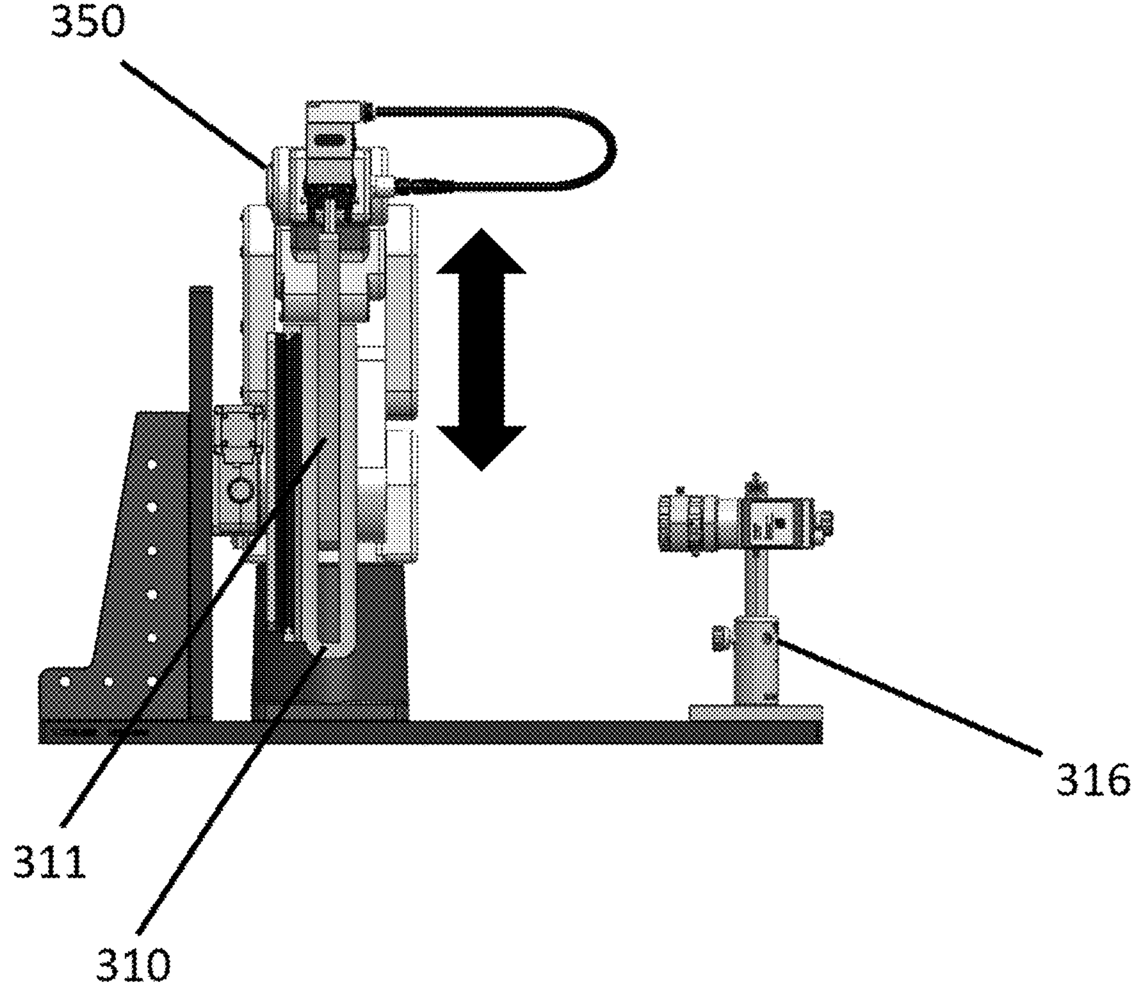
FIG. 9B is a side view of the sample container of FIG. 9A placed within the rigid adapter and engaged to the robotic arm according to various embodiments.

As shown in FIGS. 8, 9A, and 9B, in some embodiments, system 300 of FIGS. 3-6 is further configured to be compatible with a robotic arm 350 for facilitating loading and manipulation of the sample container 340. In such an embodiment, the sample container 340 is placed within a rigid adapter 311 for insertion into the sample chamber 310. The rigid adapter 311 forms a feature 313 for engaging with the robotic arm 350. FIG. 8 is a drawing showing the sample container 340 placed within the rigid adapter 311 and element 313 for engaging with the robotic arm. FIG. 9A shows a perspective view of the sample container 340 placed within the rigid adapter 311 and element 313 engaged to the robotic arm 350. The black up and down arrow demonstrates an example axis of motion provided by the robotic arm 350 to place the sample container 340 and rigid adapter 311 in front of the light detector 316 of system 300. FIG. 9B shows a side view of the sample container 340 placed within the rigid adapter 311 and element 313 engaged to the robotic arm 350. The black up and down arrow demonstrates an example axis of motion provided by the robotic arm 350 to place the sample container 340 and rigid adapter 311 in front of the light detector 316 of system 300.

Figure 10:
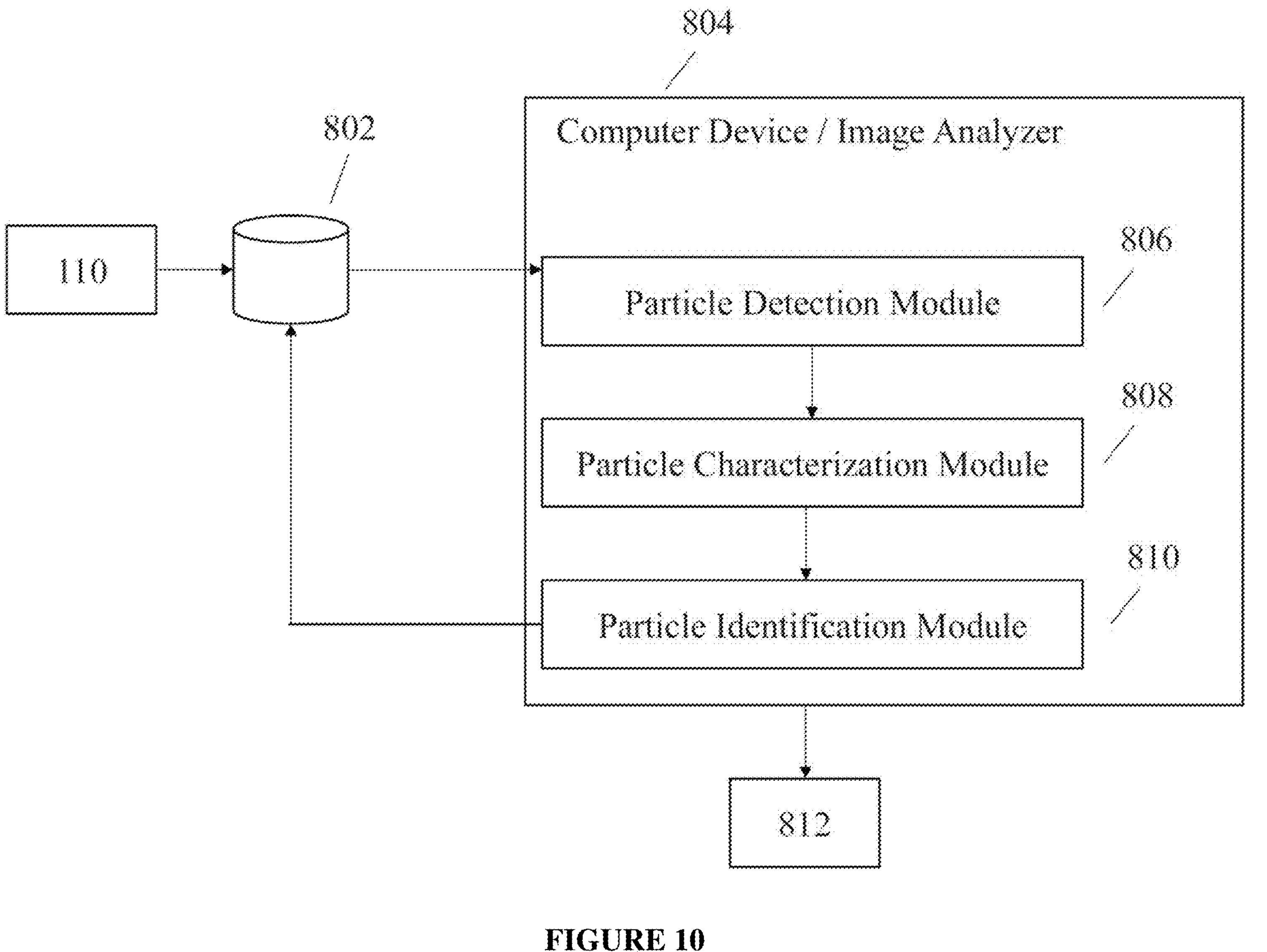
FIG. 10 is a schematic diagram of a light analyzer used in a system for detecting, characterizing, and/or identifying suspended particles in fluids in accordance with various embodiments.

FIG. 10 is a schematic diagram of a light analyzer used in a system for detecting, characterizing, and/or identifying suspended particles in fluids in accordance with various embodiments.

In various embodiments, image data may be captured by a light detector 110 and then stored in a data store 802 for further process. In various embodiments, the data store 802 may be in electronic communication with an image analyzer 804. An image analyzer 804 may comprise one or more modules. The one or more modules may include a particle detection module 806, a particle characterization module 808, and a particle identification module 810. An output 812 may result once the image analyzer 804 has processed the image data.

In various embodiments, the data store 802 may receive image files. The image files may include light intensity data in the form of pixel intensities mapped to a coordinate system.

In various embodiments, a computing device (e.g., an image analyzer 804) may be communicatively connected to the data store 802. In various embodiments, the computer device may comprise a non-transitory computer readable storage medium. In various embodiments, the non-transitory computer readable storage medium may contain instructions for carrying out any of the method described herein. For example, one or more data processors may execute the instructions present on the non-transitory computer readable storage medium.

In various embodiments, the instructions may include a process for detecting one or more particles in the sample fluid. The process may include the step of calculating a minimum threshold intensity for the pixels of the first image and the second image. The process may include the step of determining a set of features corresponding to pixel intensities above the minimum threshold intensity for first image and the second image. The process may include the step of determining a subset of features from the set of features that appear in different locations between the first image and the second image, wherein the features in the subset represent the one or more particles.

In various embodiments, the instructions may include a process for characterizing a set of properties of the one or more particles. In various embodiments, the set of properties includes one of at least shape and size. In various embodiments, the instructions for characterizing a set of properties of the one or more particles may include the step of mapping a set of pixels for each of the features in the subset of features to a coordinate system. In various embodiments, the instructions for characterizing a set of properties of the one or more particles may include the step of comparing the set of pixels to a library. The library may comprise one or more sets of pixels each corresponding to at least one characteristic such as one of at least shape or size. In various embodiments, the instructions for characterizing a set of properties of the one or more particles may include the step determining at least one of a shape and size of the one or more particles based on the comparison.

In various embodiments, the instructions may include a process for identifying the one or more particle based on the set of properties. In various embodiments, the process may include comparing the determined at least one of shape and size of the one or more particles to a library of previously identified particles. The previously identified particles may be associated with at least one of shape and size.

After the process is complete, an output file may be generated and presented in the form of a computer printout, displayed, and/or stored in a data store. Output data may include at least one of a particle presence indication, a particle size, a particle shape, and a particle identity. In various embodiments, a light analyzer may comprise a computer system (e.g., see FIG. 11).

Figure 11:
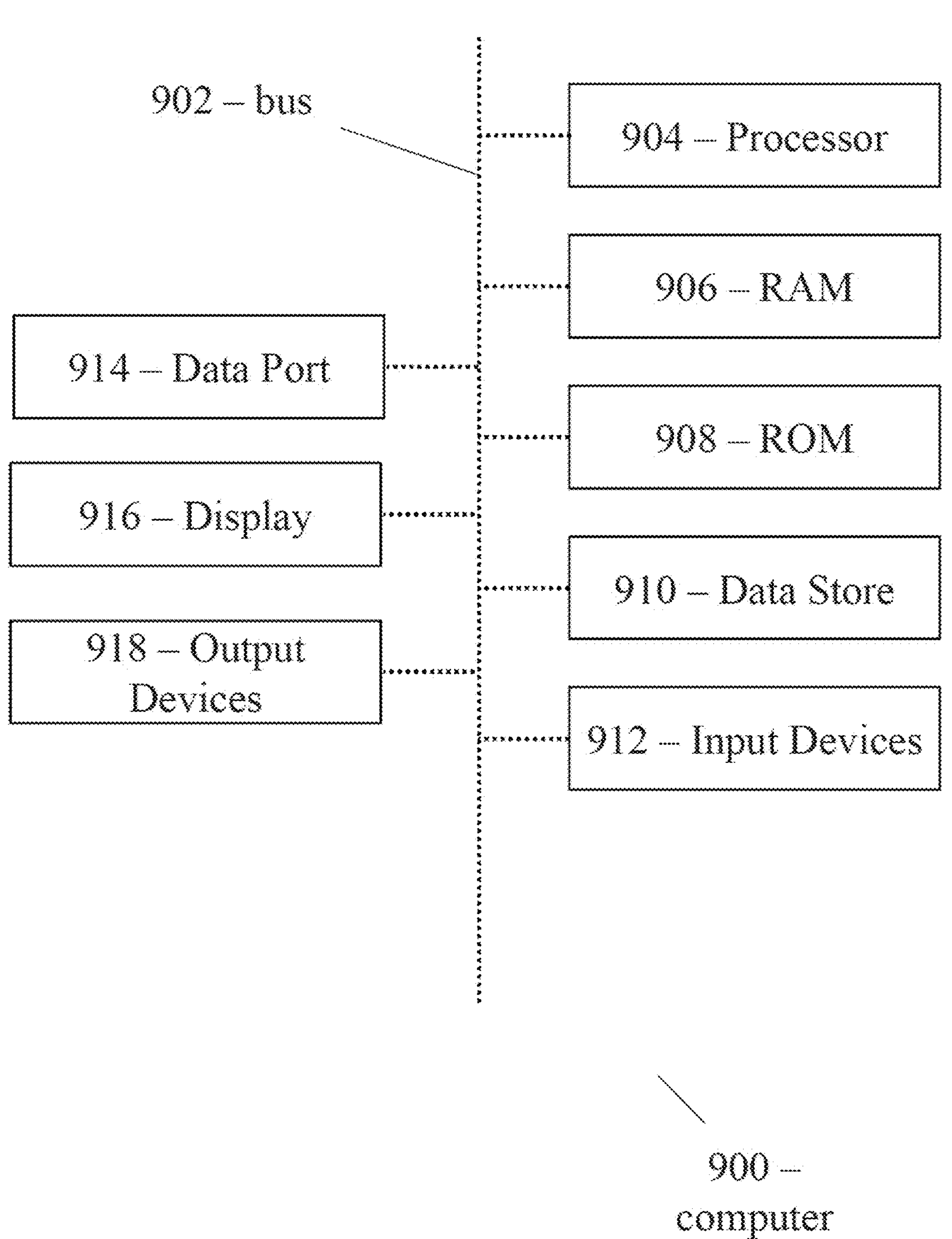
FIG. 11 is a schematic diagram of a computer system in accordance with various embodiments.

FIG. 11 is a schematic diagram of a computer system 900 in accordance with various embodiments. The computer system 900, upon which embodiments of the present teachings may be implemented. In various embodiments of the present teachings, computer system 900 may include a bus 902 or other communication mechanism for communicating information, and a processor 904 coupled with bus 902 for processing information. In various embodiments, computer system 900 can also include a memory, which can be a random-access memory (RAM) 906 or other dynamic storage device, coupled to bus 902 for determining instructions to be executed by processor 904. Memory also can be used for storing temporary variables or other intermediate information during execution of instructions to be executed by processor 904. In various embodiments, computer system 900 can further include a read only memory (ROM) 908 or other static storage device coupled to bus 902 for storing static information and instructions for processor 904. A data store 910, such as a magnetic disk or optical disk, can be provided and coupled to bus 902 for storing information and instructions.

In some embodiments, computer system 900 can be coupled via bus 902 to a display 916, such as a cathode ray tube (CRT), liquid crystal display (LCD), or light emitting diode display (LED) for displaying information to a computer user. An input device 912, including alphanumeric and other keys, can be coupled to bus 902 for communicating information and command selections to processor 904. Another type of user input device 912 is a cursor control, such as a mouse, a trackball or cursor direction keys for communicating direction information and command selections to processor 904 and for controlling cursor movement on display 916. The input device 912 typically has two degrees of freedom in two axes, a first axis (i.e., x) and a second axis (i.e., y), that allows the device to specify positions in a plane. However, it should be understood that input devices 912 allowing for 3-dimensional (x, y and z) cursor movement are also contemplated herein.

In various embodiments, computer system 900 can be coupled via bus 902 to one or more data ports 914. In various embodiments, the one or more data ports 914 may enable electronic communication between the components via bus 902 of the computer system 900 and the components 802, 804, 806, 808, 810 of an image analyzing system.

Consistent with certain implementations of the present teachings, results can be provided by computer system 900 in response to processor 904 executing one or more sequences of one or more instructions contained in memory 906. Such instructions can be read into memory 906 from another computer-readable medium or computer-readable storage medium, such as a storage device containing a particle detection module 806, a particle characterization module 808, or a particle identification module 810. Execution of the sequences of instructions contained in memory 906 can cause processor 904 to perform the processes described herein. Alternatively, hard-wired circuitry can be used in place of or in combination with software instructions to implement the present teachings. Thus, implementations of the present teachings are not limited to any specific combination of hardware circuitry and software.

According to various embodiments, computer-readable medium (e.g., data store, data storage, etc.) or computer-readable storage medium may comprise any media that participates in providing instructions to processor 904 for execution. Such a medium can take many forms, including but not limited to, non-volatile media, volatile media, and transmission media. Non-limiting examples of non-volatile media can include optical, solid state, and magnetic disks, such as 908. Examples of volatile media can include, but are not limited to, dynamic memory, such as memory 906. Examples of transmission media can include, but are not limited to, coaxial cables, copper wire, and fiber optics, including the wires that comprise bus 902.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, PROM, and EPROM, a FLASH-EPROM, any other memory chip or cartridge, or any other tangible medium from which a computer can read.

In addition to computer readable medium, instructions or data can be provided as signals on transmission media included in a communications apparatus or system to provide sequences of one or more instructions to processor 904 of computer system 900 for execution. For example, a communication apparatus may include a transceiver having signals indicative of instructions and data. The instructions and data are configured to cause one or more processors to implement the functions outlined in the disclosure herein. Representative examples of data communications transmission connections can include, but are not limited to, telephone modem connections, wide area networks (WAN), local area networks (LAN), infrared data connections, NFC connections, etc. In various embodiments, output devices 918 such as printers and displays may be used to present output files generated by the processes described herein. Output devices 918 may be used to indicate whether a particle has been detected, characteristics of a particle, or a particle's identification.

Exemplary Methods

Figure 12:
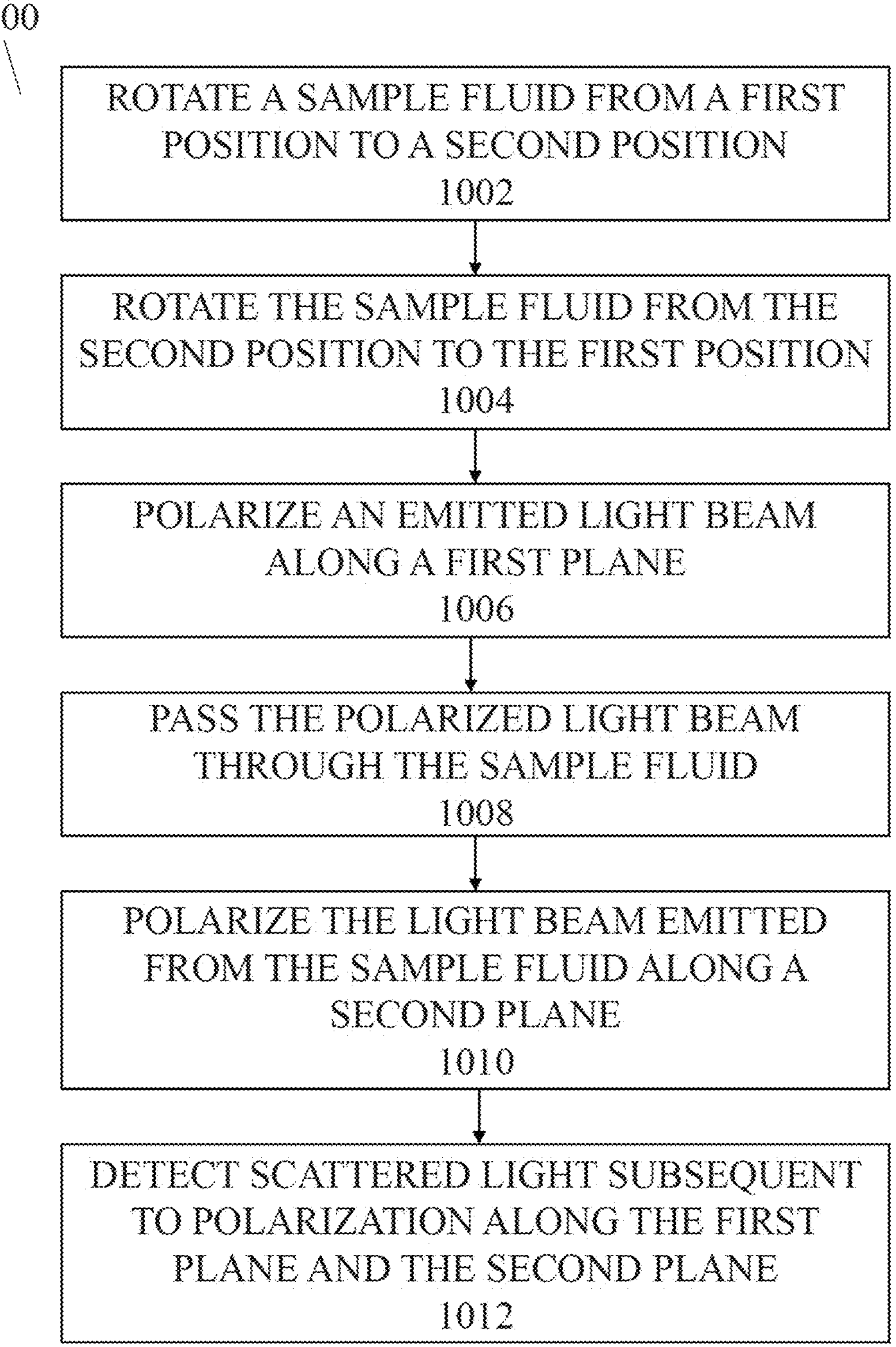
FIG. 12 is a method for detecting one or more particles in a sample fluid according to various embodiments.

FIG. 12 is a method 1000 for detecting one or more particles in a sample fluid according to various embodiments. In various embodiments, the sample fluid comprises a cell therapy product.

Step 1002 of the method comprises rotating a sample fluid from a first position to a second position in accordance with various embodiments. In various embodiments, the rotational movement is provided by a motor.

Step 1004 of the method comprises rotating the sample fluid from the second position to the first position in accordance with various embodiments. In various embodiments, the rotational movement is provided by a motor.

In various embodiments, performing steps 1002 and 1004 cause particles, if present, within the sample fluid to be mobilized. Features that remain stationary may not be particles present in the sample fluid.

Step 1006 of the method comprises polarizing an emitted light beam along a first plane in accordance with various embodiments. In various embodiments, the emitted light beam is emitted by a light source. In various embodiments, the light source comprises a light emitting diode (LED).

Step 1008 of the method comprises passing the polarized light beam through the sample fluid in accordance with various embodiments. In various embodiments, the step of passing the polarized light beam through the sample fluid comprises illuminating the entire sample fluid with the polarized light beam along the first plane.

Step 1010 of the method comprises polarizing the light beam emitted from the sample fluid along a second plane in accordance with various embodiments. In various embodiments, the first plane and the second plane are offset by between 80 to 100 degrees. In various embodiments, the first plane and the second plane are offset by 90 degrees.

Step 1012 of the method comprises detecting scattered light subsequent to polarization along the first plane and the second plane in accordance with various embodiments.

In various embodiments, the method further comprises positioning the sample fluid within a sample container. In various embodiments, the step of positioning the sample fluid within the sample container comprises delivering the sample fluid into a compartment of the sample container using an inlet port. The inlet port may be fluidically connected to the compartment in accordance with various embodiments.

In various embodiments, the method includes securing the sample container to the sample chamber by positioning a perimeter of the sample container into a space of the sample chamber. For example, in some embodiments, thumbscrews may be actuated by a user to secure the sample container to the sample chamber. In various embodiments, a width of the sample chamber may be selected based on the total fill volume of the sample container. For example, when the sample container is filled, the sample fluid may be evenly distributed within a compartment of the container. Such a configuration may prevent distortions in the container that may cause particles to appear larger or smaller than they would otherwise appear.

In various embodiments, the method comprises capturing a first image and a second image of the sample fluid.

In various embodiments, the method comprises detecting one or more particles in the sample fluid. In various embodiments, the step of detecting the one or more particles comprises calculating a minimum threshold intensity for the first image and the second image. In various embodiments, the step of detecting the one or more particles comprises determining a set of features above the minimum threshold intensity for the first image and the second image. In various embodiments, the step of detecting the one or more particles comprises determining a subset of features from the set of features that appear in different locations between the first image and the second image, wherein the features in the subset represent the one or more particles.

In various embodiments, the method comprises characterizing a set of properties of the one or more particles. In various embodiments, the step of characterizing the one or more particles comprises mapping a set of pixels for each of the features in the subset of features to a coordinate system. In various embodiments, the step of characterizing the one or more particles comprises comparing the set of pixels to a library, wherein the library comprises at least one of shape and size data. In various embodiments, the step of characterizing the one or more particles comprises determining at least one of a shape and size of the one or more particles.

In various embodiments, the method comprises identifying the one or more particles based on the set of properties. In various embodiments, the step of identifying the one or more particles comprises comparing the at least one of shape and size of the one or more particles to a library of previously identified particles, wherein the previously identified particles are associated with at least one of shape and size.

In various embodiments, the method comprises presenting output data, wherein the output data includes at least one of a particle presence indication, a particle size, a particle shape, and a particle identity.

In various embodiments, image analysis may comprise analyzing a sequence of images to generate a minimum intensity projection (MIP) of the scene that represents a background image. The MIP is a single image that includes the lowest intensity pixel values observed during the full sequence. Since particles scatter light and appear as areas of high intensity, the MIP only contains static features. The method may include creating a new blank image for accumulating all the output of subtracting each individual image in the sequence and the background MIP. Areas of high pixel intensity in the resulting image may indicate the presence of particles. If particles are detected, the sample fluid may be rejected based on characteristics such as size, quantity, or morphology.

EQUIVALENCE

Those skilled in the art will recognize or be able to ascertain using no more than routine experimentation, many equivalents to the specified embodiments of the technologies described herein. It is to be understood that the technologies encompass all variants, combinations, and permutations in which one or more limitations, elements, clauses, descriptive terms, etc., from one or more of the listed claims is introduced into another claim dependent on the same base claim (or, as relevant, any other claim) unless otherwise indicated or unless it would be evident to one of ordinary skill in the art that a contradiction or inconsistency would arise. Further, it should also be understood that any embodiment or aspect of the technologies can be explicitly excluded from the claims, regardless of whether the specific exclusion is recited in the specification. The scope of the present disclosure is not limited to the description herein, but rather is as set forth in the claims below.

EXAMPLES

Figure 13:
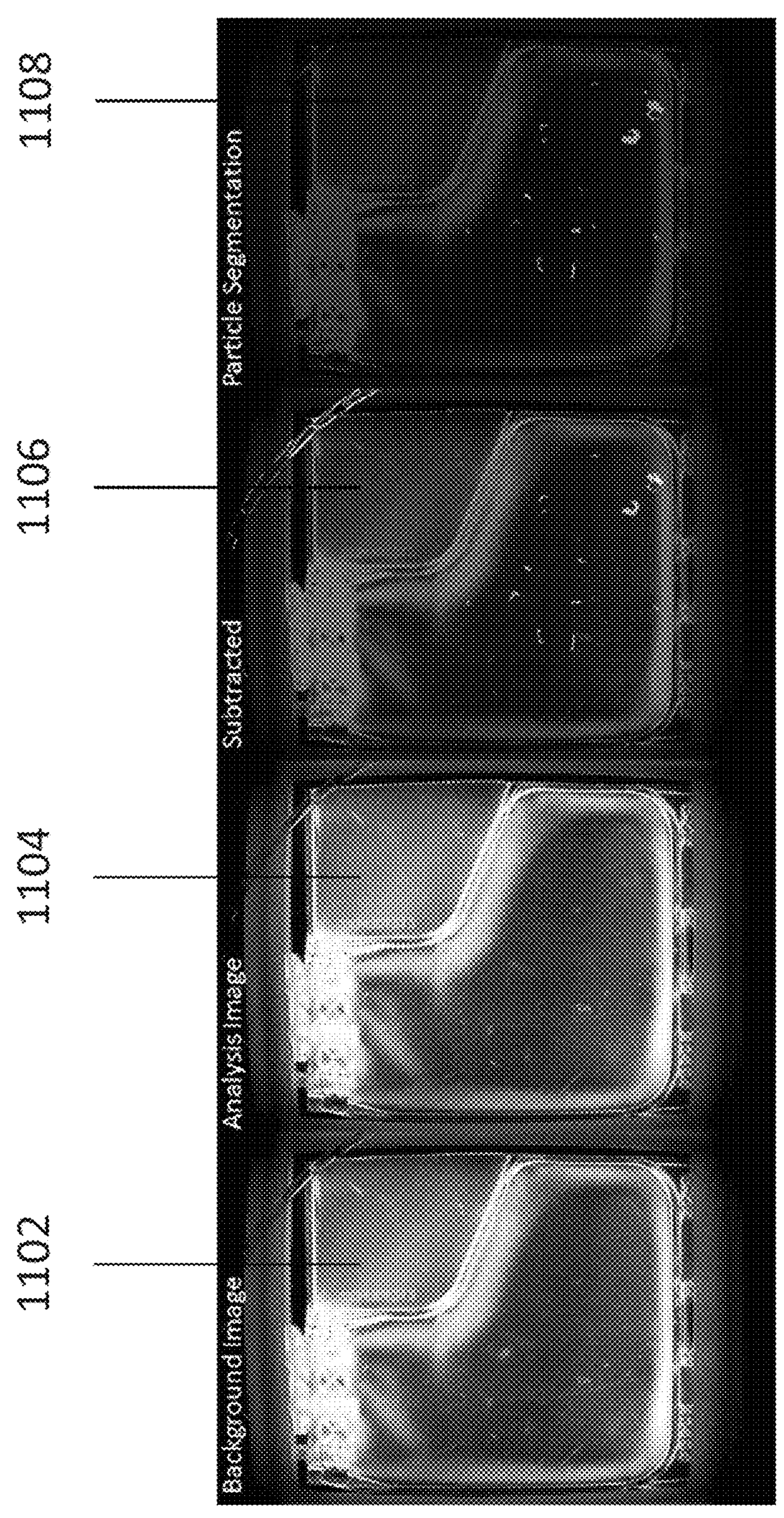
FIG. 13 is four photographs captured at difference stages of a detection, characterization, and/or identification process by a system for detecting, characterizing, and identifying suspended particles in fluids in accordance with various embodiments.

FIG. 13 is four photographs captured at difference stages of a detection, characterization, and/or identification process by a system for detecting, characterizing, and identifying suspended particles in fluids in accordance with various embodiments.

Detection Only

In some cases, where it was only necessary to determine the presence or absence of a particle within a container, we created an algorithm to provide a binary response (yes, a particle is present or no, a particle is not present). For this, we subtracted the MIP from one or more of the images from a captured set and if the subtracted output had any pixels that were above a certain threshold it meant something was moving within the fluid of the container (e.g., a particle floating in a fluid). See 1102, 1104, and 1106. If after thresholding, the output was empty then that indicated that no particles were detected.

Particle Sizing and Counting

In some cases, we wanted information relating to shape and size of the detected particles. In these cases, every image that was captured during analysis was subtracted from the MIP, the output of segmentation (See 1108) gave us the total number of distinct "blobs" and their pixel intensity. The algorithm kept a running average of both of these numbers and binned them into different size buckets. One step included calibrating a pixel area to a standard measurement (e.g., micrometers) by using test samples filled with beads or particles of known sizes. The pixel area of those created a conversion factor of pixel area/um that was applied to the average calculated at the end.

Deep Learning/Neural Network

Another implementation included training an object detection model (e.g., using a deep neural network). We did this to count and categorize particles according to a description (e.g., shape/morphology and/or size). Examples included fibrous particles and metallic particles. This was done by training a model by capturing images with particles of interest that later became part of a training set. The training set was annotated according to their type (e.g., shape/morphology and/or size). Once the algorithm was trained, experimental data was analyzed by the trained algorithm and the particles were classified accordingly. A trained model was used to generate an output showing the number of detected particles and each particle was categorize according to shape/morphology and/or size.

The invention claimed is:

1. A system for detecting one or more particles in a sample fluid, comprising:

a motor for providing angular momentum to a rotational stage;

a light source for emitting a light beam, wherein the light source is mounted to the rotational stage;

a sample chamber removably coupled to the light source, wherein the sample chamber physically restrains a sample container between a first optical element and a second optical element, wherein the first optical element polarizes the light beam along a first plane and the second optical element polarizes the light beam along a second plane; and a light detector.

2. The system of claim 1, wherein the sample chamber further comprises a first plate joined to a second plate by a curved region to create a space, and wherein a first rail and a second rail extend away from the first plate of the sample chamber.

3. The system of claim 2, wherein the light source comprises a first surface having a first channel and an opposing second surface having a second channel, wherein the first rail engages the first channel and the second rail engages the second channel to couple the sample chamber to the light source.

4. The system of claim 2, wherein the sample container comprises a compartment surrounded by a perimeter and the perimeter fits into the space of the sample chamber.

5. The system of claim 4, wherein the compartment comprises a translucent flexible material.

6. The system of claim 4, wherein the sample container further comprises:

an air vent connecting the compartment to an external atmosphere;

an outlet fluidically coupled to the compartment; and an inlet fluidically coupled to the compartment.

7. The system of claim 2, wherein the first plate and the second plate of the sample chamber each comprise:

a closing element extending along a first end of the plate to create a slot; and a cavity extending along a second end of the plate, wherein the first optical element is positioned within the slot and the cavity of the first plate and the second optical element is positioned within the slot and the cavity of the second plate.

8. The system of claim 1, wherein the first plane and the second plane are offset by between 80 to 100 degrees.

9. The system of claim 1, wherein the light detector includes a camera for capturing a first image and a second image of a sample fluid contained within the sample container.

10. The system of claim 1, wherein the light source includes a light emitting diode (LED).

11. The system of claim 9, wherein the light source is positioned to illuminate the entire sample fluid.

12. The system of claim 1, further comprising an image analysis system, wherein the image analysis system comprises:

a data store for receiving light intensity data for the first image and the second image;

a computing device communicatively connected to the data store and configured to receive the light intensity data, the computing device comprising a non-transitory computer readable storage medium containing instructions which, when executed on one or more data processors, cause the one or more data processors to perform a process, the process comprising:

detecting one or more particles in the sample fluid; and characterizing a set of properties of the one or more particles.

13. The system of claim 12, wherein the process further comprises:

identifying the one or more particle based on the set of properties.

14. The system of claim 13, wherein the set of properties includes one of at least shape and size.

15. The system of claim 11, wherein the step of detecting the one or more particles comprises:

calculating a minimum threshold intensity for the pixels of the first image and the second image;

determining a set of features corresponding to pixel intensities above the minimum threshold intensity for first image and the second image; and determining a subset of features from the set of features that appear in different locations between the first image and the second image, wherein the features in the subset represent the one or more particles.

16. The system of claim 15, wherein the step of characterizing the one or more particles comprises:

mapping a set of pixels for each of the features in the subset of features to a coordinate system;

comparing the set of pixels to a library, wherein the library comprises one or more sets of pixels each corresponding to at least one characteristic, wherein the at least one characteristic includes shape or size; and determining at least one of a shape and size of the one or more particles based on the comparison.

17. The system of claim 16, wherein the step of identifying the one or more particle comprises:

comparing the determined at least one of shape and size of the one or more particles to a library of previously identified particles, wherein the previously identified particles are associated with at least one of shape and size.

18. The system of claim 17, further comprising an output device for presenting output data, wherein the output data includes at least one of a particle presence indication, a particle size, a particle shape, and a particle identity.

19. The system of claim 1, wherein the sample fluid comprises a cell therapy product.

* * * * *